US012031102B2

(12) United States Patent
Sudo et al.

(10) Patent No.: US 12,031,102 B2
(45) Date of Patent: Jul. 9, 2024

(54) LUBRICANT FOR VEHICLE HAVING VEHICLE BODY CHARGED BY DRIVING

(71) Applicants: Junichi Sudo, Miyoshi (JP); Hiroyuki Arai, Toyota (JP); Youji Kanehara, Nagoya (JP); Koushi Yamada, Odawara (JP); Ko Tanimura, Toyota (JP); Tomonobu Komoriya, Chigasaki (JP)

(72) Inventors: Junichi Sudo, Miyoshi (JP); Hiroyuki Arai, Toyota (JP); Youji Kanehara, Nagoya (JP); Koushi Yamada, Odawara (JP); Ko Tanimura, Toyota (JP); Tomonobu Komoriya, Chigasaki (JP)

(73) Assignees: TOYOTA JIDOSHA KABUSHIKI KAISHA, Toyota (JP); KYODO YUSHI CO., LTD., Fujisawa (JP)

( * ) Notice: Subject to any disclaimer, the term of this patent is extended or adjusted under 35 U.S.C. 154(b) by 375 days.

(21) Appl. No.: 17/425,141

(22) PCT Filed: Jan. 21, 2020

(86) PCT No.: PCT/JP2020/001824
§ 371 (c)(1),
(2) Date: Jul. 22, 2021

(87) PCT Pub. No.: WO2020/153318
PCT Pub. Date: Jul. 30, 2020

(65) Prior Publication Data
US 2022/0112440 A1    Apr. 14, 2022

(30) Foreign Application Priority Data

Jan. 22, 2019  (JP) .................................. 2019-008170
Jan. 16, 2020  (JP) .................................. 2020-004896

(51) Int. Cl.
*C10M 169/00* (2006.01)
*C10M 115/08* (2006.01)
(Continued)

(52) U.S. Cl.
CPC ........ *C10M 169/00* (2013.01); *C10M 115/08* (2013.01); *C10M 125/02* (2013.01);
(Continued)

(58) Field of Classification Search
CPC .......................... C10M 169/00; C10M 115/08; C10M 125/02; C10M 147/00; C10M 161/00;
(Continued)

(56) References Cited

U.S. PATENT DOCUMENTS 8,470,748 B2 * 6/2013 Shimura .............. C10M 169/00
508/130
2002/0076125 A1  6/2002 Iso et al.
(Continued)

FOREIGN PATENT DOCUMENTS

| CN | 102105573 A | 6/2011 |
| CN | 104342270 A | 2/2015 |

(Continued)

*Primary Examiner* — Ellen M McAvoy
(74) *Attorney, Agent, or Firm* — Oliff PLC

(57) ABSTRACT

A lubricant that enables to improve control stability of an automobile or the like having a vehicle body charged by driving. A lubricant for improving control stability of an automobile includes a base oil and an additive containing a carbon black. A kit for improving control stability of an automobile includes a discharging member including a protrusion that performs a self-discharging by air-ionizing and the lubricant. A method also improves control stability of an automobile.

9 Claims, 3 Drawing Sheets

(51) Int. Cl.
    *C10M 125/02* (2006.01)
    *C10M 147/00* (2006.01)
    *C10M 161/00* (2006.01)
    *F16C 33/66* (2006.01)
    *C10N 40/02* (2006.01)
    *C10N 50/10* (2006.01)

(52) U.S. Cl.
    CPC ........ *C10M 147/00* (2013.01); *C10M 161/00* (2013.01); *F16C 33/6633* (2013.01); *C10M 2201/041* (2013.01); *C10M 2203/003* (2013.01); *C10M 2213/062* (2013.01); *C10N 2040/02* (2013.01); *C10N 2050/10* (2013.01)

(58) Field of Classification Search
    CPC ...... C10M 2201/041; C10M 2203/003; C10M 2213/062; F16C 33/6633; C10N 2040/02; C10N 2050/10
    See application file for complete search history.

(56) References Cited

U.S. PATENT DOCUMENTS

| | | | | |
|---|---|---|---|---|
| 2004/0186025 | A1* | 9/2004 | Nakatani | C10M 119/22 508/130 |
| 2007/0179066 | A1* | 8/2007 | Sakamoto | C10M 169/02 508/113 |
| 2009/0043452 | A1 | 2/2009 | Sekiya | |
| 2011/0111993 | A1* | 5/2011 | Shimura | C10M 169/00 508/130 |
| 2016/0059838 | A1* | 3/2016 | Yamada | B62D 1/04 180/443 |
| 2016/0223024 | A1* | 8/2016 | Tanahashi | F16D 3/24 |
| 2016/0280162 | A1 | 9/2016 | Yamada et al. | |

FOREIGN PATENT DOCUMENTS

| | | |
|---|---|---|
| CN | 105392267 A | 3/2016 |
| CN | 105683033 A | 6/2016 |
| CN | 105835644 A | 8/2016 |
| DE | 102005013266 A1 | 9/2006 |
| JP | 2002-195277 A | 7/2002 |
| JP | 2003-269469 A | 9/2003 |
| JP | 2004-169862 A | 6/2004 |
| JP | 2009-40171 A | 2/2009 |
| JP | 2013-35344 A | 2/2013 |
| JP | 5321587 B2 | 10/2013 |
| JP | 2015-209121 A | 11/2015 |
| JP | 2016-49880 A | 4/2016 |
| JP | 2016-141167 A | 8/2016 |
| KR | 10-2008-0005593 A | 1/2008 |
| RU | 2 497 937 C2 | 11/2013 |
| RU | 2 529 461 C1 | 9/2014 |
| WO | 1998/033874 A1 | 8/1998 |
| WO | 2006/114442 A1 | 11/2006 |
| WO | 2008/045647 A1 | 4/2008 |
| WO | 2010/010789 A1 | 1/2010 |

* cited by examiner (a)

(b)

LUBRICANT FOR VEHICLE HAVING VEHICLE BODY CHARGED BY DRIVING

TECHNICAL FIELD

The present invention relates to a lubricant for a vehicle having a vehicle body charged by driving.

BACKGROUND ART

In an automobile or the like, control stability is one of the most important performances alongside with ride comfort. Generally, the control stability and the ride comfort in the automobile or the like are known to be the performances difficult to be achieved at the same time. For example, Patent Literature 1 discloses a control device for a current control type damping force variable damper in order to achieve obtaining the control stability and the ride comfort at the same time.

Patent Literature 2 discloses a tire in which inclined grooves that extend from the center portion in the tread width direction to tread shoulders and are inclined with respect to the tire circumferential direction are formed on its land portions that come in contact with a road surface in order to ensure sufficient drainage performance and control stability.

Patent Literature 3 discloses a driving air guiding structure for an automobile in order to achieve improved control stability and fuel efficiency by reliably suppressing entrainment of driving air around tires.

In an automobile or the like, a lubricant is used in various sliding portions, such as a power transmission portion, a steering mechanism portion, and an impact absorbing portion. The lubricant used for these usages usually comprises an additive.

For example, Patent Literature 4 discloses a grease composition that comprises a conductive material, such as carbon black, in a proportion of 0.1 to 10 weight % as a grease composition used under conditions of high temperature, high speed, and high load, such as in electronic equipment of an automobile, an alternator and an intermediate pulley as engine accessories, an electromagnetic clutch for a car air conditioner, a water pump, an electromagnetic clutch for a gas heat pump, and a compressor, and furthermore, enclosed in a rolling bearing appropriate for a site where water easily enters.

CITATION LIST

Patent Literature

Patent Literature 1: JP2009-40171A
Patent Literature 2: JP2013-35344A
Patent Literature 3: JP2015-209121A
Patent Literature 4: JP2002-195277A

SUMMARY OF INVENTION

Technical Problem

As described above, there has been known various techniques in order to improve control stability of an automobile or the like. However, these prior art techniques had some problems. For example, as described in Patent Literature 1, the control stability and the ride comfort in an automobile or the like are conflicting performances, and they are usually difficult to be achieved at the same time. Generally, in order to improve the control stability, it is advantageous to set the damper hard. However, such a setting possibly lowers the ride comfort.

The control stability may also be affected by a tire (Patent Literature 2). Generally, in order to improve the control stability, it is advantageous to enlarge a block area on a tread surface of a tire. However, enlarging the block area on the tread surface of the tire, it is possible that a drainage performance on a wet road surface is lowered, and as a result, the control stability on the wet road surface may be lowered.

A member that improves an aerodynamic characteristic, such as the driving air guide structure for an automobile as described in Patent Literature 3 possibly generate undesirable effects, such as a weight increase, an interference to a road surface, and a deteriorated designability, caused by an installation of the member.

The grease composition described in Patent Literature 4 is applied to electric equipment and the like of an automobile. Patent Literature 4 does not describe at all about a relation between the grease composition described in the document and the control stability of an automobile or the like.

Accordingly, one of its objectives of the present invention is to provide a lubricant that enables to improve control stability of an automobile or the like having a vehicle body charged by driving.

Solution to Problem

The inventors have variously examined means for solving the problems. The inventors have found that comprising an additive containing a carbon black as a conductive material in a lubricant in a form of a grease composition used for rolling bearings as sliding portions that support axle shafts of an automobile or the like significantly improves control stability of an automobile or the like including a sliding portion to which the lubricant is applied. The inventors have completed the present invention based on the finding.

That is, the present invention encompasses the following aspects and embodiments.

(1) A lubricant for improving control stability of an automobile, comprising a base oil and an additive containing a carbon black.

(2) The lubricant according to Embodiment (1), wherein the additive further contains polytetrafluoroethylene.

(3) The lubricant according to Embodiment (1) or (2), further comprising a thickener, wherein the lubricant is in a form of a grease composition.

(4) A kit for improving control stability of an automobile, comprising a discharging member including a protrusion that performs a self-discharging by air-ionizing, and the lubricant according to any one of Embodiments (1) to (3).

(5) A method for improving control stability of an automobile, comprising a step of applying the lubricant according to any one of Embodiments (1) to (3) to a sliding portion of an automobile.

(6) The method according to Embodiment (5), further comprising a step of disposing a discharging member including a protrusion that performs a self-discharging by air-ionizing on a vehicle body of an automobile.

(7) The method according to Embodiment (5) or (6), wherein the sliding portion is an axle shaft rolling bearing.

Advantageous Effects of Invention

The present invention enables to provide a lubricant that enables to improve control stability of an automobile or the like having a vehicle body charged by driving.

The description includes the contents as disclosed in the descriptions and/or drawings of Japanese Patent Application Nos. 2019-008170 and 2020-004896, which are priority documents of the present application.

BRIEF DESCRIPTION OF DRAWINGS

FIG. 3(a) illustrates a measurement result of the test vehicle in Comparative Example 1 and FIG. 3(b) illustrates a measurement result of the test vehicle in Example 2. In FIG. 3(a) and FIG. 3(b), the horizontal axes are elapsed times (second) and vertical axes are electric potentials (kV).

DESCRIPTION OF EMBODIMENTS

Figure 1:
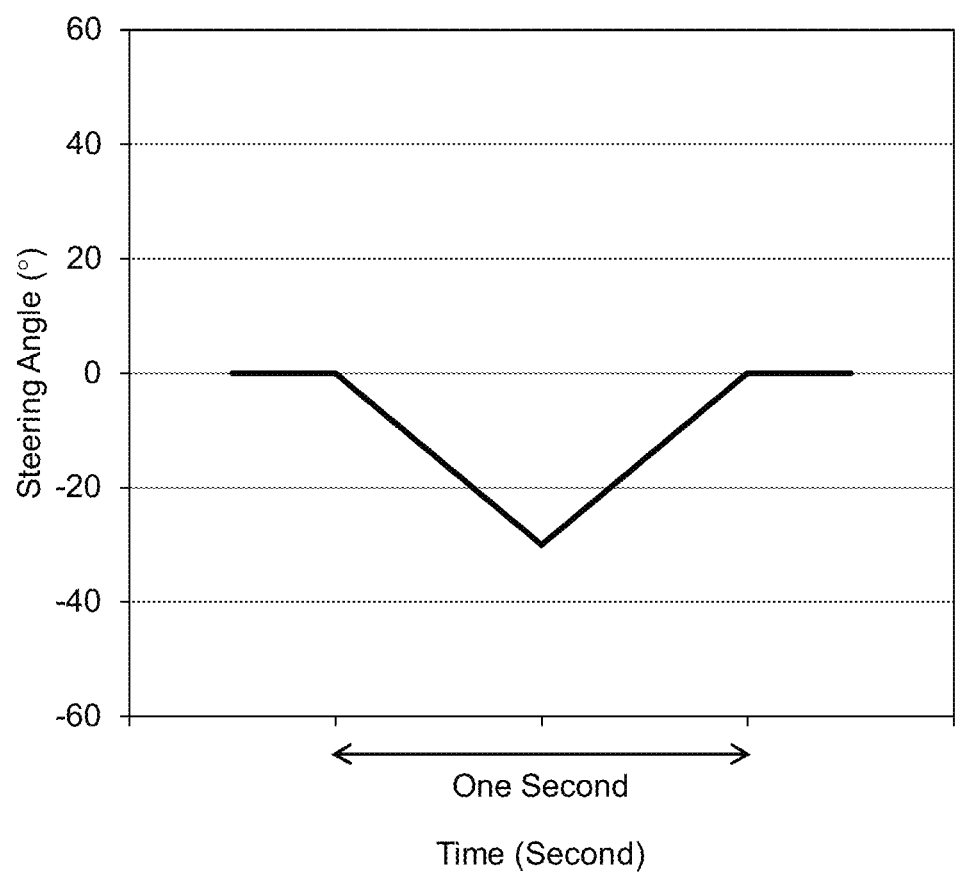
FIG. 1 is a graph that illustrates steering angles over time during lane change in a measurement test of control stability.

The following describes a preferred embodiment of the present invention in detail.

<1. Lubricant>

The inventors have found that comprising an additive containing a carbon black as a conductive material in a lubricant in a form of a grease composition used for rolling bearings as sliding portions that support axle shafts of an automobile or the like significantly improves control stability of an automobile or the like. Accordingly, one aspect of the present invention relates to a lubricant for improving control stability of an automobile, and the lubricant comprises a base oil and an additive containing the carbon black.

In each aspect of the present invention, the reason why the above-described operational advantage is provided can be described as follows. Note that each aspect of the present invention is not limited to the following effects or principles. A vehicle body of an automobile or the like is usually positively charged due to, for example, friction between tires and a road surface and disturbance caused by driving. Meanwhile, air is usually positively charged. In view of this, when the automobile or the like is driven, an electrostatic repulsion force is generated between surfaces of the vehicle body and the air, thereby generating a repulsion in the direction moving away from the automobile or the like in an airflow near the surfaces of the vehicle body. The tires of the automobile or the like are also usually positively charged due to contact with the road surface. In particular, in recent years, a content of silica used in a tire has been increasing due to increasing demand for energy saving tires. Such a tire with a high silica content has a high tendency of being positively charged. As a result of the charge as described above, the automobile or the like fails to obtain desired aerodynamic performance and/or driving performance, and thus, may result in lowered control stability. Here, when the lubricant of the aspect is applied to sliding portions, for example, axle shaft rolling bearings of the automobile or the like, the carbon black as a conductive material contained in the lubricant may remove the positive electric charge charged on the surfaces of the vehicle body and/or the tires via the sliding portions. Accordingly, the lubricant of the aspect enables to improve the control stability of the automobile or the like through the removal of the charge on the surfaces of the vehicle body and/or the tires of the automobile or the like.

In each aspect of the present invention, charge removal effect of the surfaces of the vehicle body and/or the tires of the automobile or the like can be quantitatively measured as follows but not limited to this. For example, a test vehicle, such as an automobile or the like having sliding portions, for example, axle shaft rolling bearings to which the lubricant or a kit of one aspect of the present invention is applied, is prepared. A contactless surface potential measuring device (with which, for example, surface potentials of positive electrode and negative electrode within a range of 0.1 to 5 kV are measurable) is used to measure secular change of potentials of the surface and/or the tire of the test vehicle during driving. The measurement results are compared with measurement results of a comparison test vehicle.

In each aspect of the present invention, the control stability of an automobile or the like means stability of a motion performance mainly relating to steering in basic motion performances of the automobile or the like, such as "driving, steering, and stopping." The control stability of the automobile or the like can be defined based on, for example, a following capability and a responsiveness of a vehicle, such as the automobile or the like, when a driver of the automobile or the like actively steers, a course holding performance of the automobile or the like when the driver of the automobile or the like does not actively steer, and a convergence against external factors, such as road surface shape or lateral wind. In each aspect of the present invention, the control stability of the automobile or the like can be quantitatively measured by, for example, preparing a test vehicle, such as an automobile or the like having a sliding portion, for example, an axle shaft rolling bearing to which the lubricant or the kit of one aspect of the present invention is applied and evaluating the responsiveness of the test vehicle to control of the test vehicle, but not limited to this. In the case of the above-described method, for example, the controllability of the test vehicle can be measured by steering angle and the responsiveness of a behavior of the test vehicle can be measured by vehicle yaw angle acceleration. The steering angle can be measured by, for example, a steering angle sensor or a controller area network (CAN) data logger mounted on the vehicle. The vehicle yaw angle acceleration can be measured by, for example, a gyro sensor.

In each aspect of the present invention, the automobile or the like means a vehicle having any number, including four or two, of wheels made of rubber (tires) and including a prime mover, such as an engine or a motor. The automobile or the like included in the above-described definition herein is hereinafter simply described as an "automobile" in some cases.

In each aspect of the present invention, the axle shaft rolling bearing is a rolling bearing that supports an axle shaft in the automobile or the like, and in the technical field, it means a member referred to as a rolling bearing unit for wheel supporting, an axle shaft bearing, a hub unit, a hub bearing, a wheel hub bearing, a wheel bearing, or the like. The axle shaft rolling bearing usually has a structure that rotatably supports a hub wheel for mounting a wheel of the automobile or the like via a multiple-row rolling bearing. The axle shaft rolling bearing of the automobile or the like to which the lubricant of one aspect of the present invention is applied may be various kinds of bearings usually used in the technical field, such as a multiple-row angular contact ball bearing or a multiple-row tapered roller bearing. The lubricant of the aspect is also applicable to the sliding portion, such as the axle shaft rolling bearing, of the automobile or the like that includes a discharging member including a protrusion that performs a self-discharging by air-ionizing. In the embodiment, the discharging member is preferred to be, for example, an aluminum member (for example, an aluminum foil or an adhesive tape, such as an aluminum tape or a conductive film tape) or a conductive coating, but it is not limited to this. Applying the lubricant of the aspect to the sliding portion, for example, the axle shaft rolling bearing of the automobile or the like that includes the discharging member including the protrusion that performs the self-discharging by air-ionizing enables removing the positive electric charge charged on the surfaces and/or the tires of the vehicle via the discharging member in addition to the sliding portions.

In the lubricant of the aspect, the base oil can be appropriately selected from various kinds of base oils, such as mineral oils and synthetic oils, usually used in the technical field. The mineral oil contained in the lubricant of the aspect may be any of paraffin mineral oils and naphthenic mineral oils, and is preferably a paraffin mineral oil. The mineral oil is preferably produced by appropriately combining any of one or more refining means selected from, for example, vacuum distillation, oil deasphalting, solvent extraction, hydrocracking, solvent dewaxing, sulfuric acid cleaning, clay refining, and hydrorefining. A synthetic oil contained in the lubricant of the aspect may be, for example, any known synthetic oil, such as a hydrocarbon synthetic oil containing a poly-α-olefin oil using 1-decene as a starting material and a co-oligomer oil of α-olefin and ethylene, a phenyl ether synthetic oil, an ester synthetic oil, a polyglycol synthetic oil, and a silicone oil, and is preferably a hydrocarbon synthetic oil consisting only of carbon and hydrogen atoms.

The base oil may be comprised of any of the mineral oils and the synthetic oils exemplified above, or may be comprised as a mixture of a plurality of mineral oils and/or synthetic oils. The base oil preferably consists only of a mineral oil. When the base oil consists only of a mineral oil, cost can be reduced. Comprising the base oil having the above-described features enables the lubricant of the aspect to exhibit a desired fluidity when it is applied to the sliding portion, for example, the axle shaft rolling bearing.

In the lubricant of the aspect, the base oil preferably has a kinematic viscosity in a range of 40 to 200 mm$^2$/s at 40° C., and more preferably has a kinematic viscosity in a range of 60 to 100 mm$^2$/s. When the kinematic viscosity of the base oil is less than the lower limit value, a sufficient oil film cannot be formed in the sliding portion, for example, the axle shaft rolling bearing, to which the lubricant of the aspect is applied, thereby possibly causing a damage on a rolling surface of the axle shaft rolling bearing. When the kinematic viscosity of the base oil exceeds the upper limit value, a viscous resistance of the lubricant of the aspect increases to possibly increase a torque and generate heat in the sliding portion, for example, the axle shaft rolling bearing, to which the lubricant of the aspect is applied. Accordingly, when the base oil having a kinematic viscosity in the above-described range is contained, the lubricant of the aspect can form the sufficient oil film and exhibit the desired fluidity in the sliding portion, for example, the axle shaft rolling bearing to which the composition is applied.

In each aspect of the present invention, the kinematic viscosity of the base oil can be measured based on, for example, JIS K2283, using a glass capillary viscometer, but it is not limited to this.

In the lubricant of the aspect, the carbon black as an additive can be appropriately selected from ones having various forms usually used as a conductive material. The carbon black has a primary particle size preferably in a range of 1 to 100 nm, and more preferably in a range of 5 to 50 nm.

A content of the carbon black is preferably in a range of 0.1 to 15 mass %, more preferably, in a range of 0.5 to 10 mass %, and further more preferably, in a range of 2 to 8 mass %, with respect to a total mass of the lubricant. When the content of the carbon black is less than the lower limit value, the conductivity of the lubricant of the aspect becomes insufficient, and thus, the charge on the surfaces of the vehicle body and/or the tires of the automobile or the like to which the lubricant is applied is possibly insufficiently removed. When the content of the carbon black exceeds the upper limit value, the fluidity of the lubricant of the aspect is lowered, and thus, the lubricant possibly fails to sufficiently spread in the sliding portion, for example, the axle shaft rolling bearing, to which the lubricant of the aspect is applied. Accordingly, containing the carbon black having the above-described features enables the lubricant of the aspect to improve the control stability of the automobile or the like when it is applied to the sliding portion, for example, the axle shaft rolling bearing of the automobile or the like.

In the lubricant of the aspect, the additive preferably further contains polytetrafluoroethylene (PTFE). The PTFE is known to be a substance easily negatively charged. Accordingly, in the embodiment, the additive of the lubricant of the aspect containing the PTFE enables to neutralize the positive electric charge on the surfaces of the vehicle body and/or the tires of the automobile or the like to which the lubricant is applied, thereby removing the charge on the surfaces of the vehicle body and/or the tires of the automobile or the like.

In the embodiment, a particle size of the PTFE is not specifically limited. An average particle size in a particle size distribution of the PTFE is preferably in a range of 0.5 to 50 μm, and more preferably, in a range of 1 to 15 μm. A content of the PTFE is preferably in a range of 0.1 to 15 mass %, more preferably in a range of 0.5 to 10 mass %, and further more preferably in a range of 1 to 8 mass %, with respect to the total mass of the lubricant. When the content of the PTFE is less than the lower limit value, the charge on the surfaces of the vehicle and/or the tires of the automobile or the like to which the lubricant of the embodiment is applied possibly insufficiently removed. When the content of the PTFE exceeds the upper limit value, the fluidity of the lubricant of the aspect is lowered to possibly fail to sufficiently spread the lubricant in the sliding portion, for example, the axle shaft rolling bearing, to which the lubricant of the aspect is applied. Accordingly, containing the PTFE having the above-described features enables the lubricant of the aspect to further improve the control stability of the automobile or the like when it is applied to the sliding portion, for example, the axle shaft rolling bearing of the automobile or the like.

The lubricant of the aspect can comprise one or more further additives usually used in the technical field as desired. Examples of further additives can contain, for example, a solid additive other than the carbon black or the PTFE (for example, molybdenum disulfide, graphite, or melamine cyanurate (MCA)), an extreme pressure agent (for example, olefin sulfide, ester sulfide, or sulfurized fat), an antiwear agent (for example, phosphate ester, acidic phosphoric acid ester, acidic phosphoric ester amine salt, zinc dithiophosphate, or zinc dithiocarbamate), an oiliness agent (for example, alcohols, amines, esters, or animal and plant based oil), an antioxidant (for example, phenolic antioxidant or amine antioxidant), a rust inhibitor (for example, fatty acid amine salts, zinc naphthenates, or metal sulfonates), and a metal deactivator (for example, benzotriazoles or thiadiazoles), but not limited to these. When the lubricant of the aspect comprises further additives, the further additives may be comprised of any of the above-exemplified additives or may be comprised as a mixture of a plurality of additives.

The lubricant of the aspect preferably further comprises a thickener. In the case of the embodiment, the lubricant of the aspect can be in a form of a grease composition in semisolid or solid state. In the grease composition of the embodiment, the thickener can be appropriately selected from various kinds of materials, such as soap-based materials and non-soap-based materials usually used in the technical field. Examples of the soap-based materials include, for example, a lithium soap. Examples of the non-soap-based materials include, for example, inorganic materials, such as silica powder, titania, alumina, or carbon fibers, in addition to organic materials, such as a diurea compound or fluorine powder. In each aspect of the present invention, the diurea compound is usually a compound represented by the formula (I):

[Chem 1]

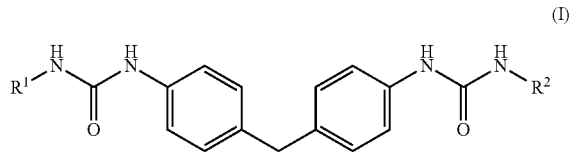

(I)

In the formula (I), $R^1$ and $R^2$ are preferably independently from each other a substituted or unsubstituted $C_6$-$C_{20}$-alkyl or a substituted or unsubstituted $C_6$-$C_{18}$-aryl, more preferably a substituted or unsubstituted $C_6$-$C_{18}$-aryl, and further more preferably a substituted or unsubstituted phenyl, and it is particularly preferred that both of $R^1$ and $R^2$ are 4-methylphenyl. In each aspect of the present invention, the diurea compound represented by the above-described formula (I) in which $R^1$ and $R^2$ are independently from each other a substituted or unsubstituted $C_6$-$C_{18}$-aryl is described as an "aromatic diurea compound" in some cases. The thickener contained in the grease composition of the embodiment is preferably the diurea compound or the lithium soap, or their mixture, more preferably the diurea compound, and further more preferably the aromatic diurea compound. Containing the thickener having the above-described features enables the grease composition of the embodiment to exhibit a high inflow property.

The thickener is preferably contained in the grease composition by an amount with which a worked penetration of the grease composition of the embodiment falls in a range of 220 to 385. The worked penetration is more preferably in a range of 265 to 340. The content of the thickener that satisfies the above-described requirement is usually in a range of 2 to 30 mass %, typically in a range of 3 to 25 mass %, and in particular in a range of 4 to 20 mass %, with respect to a total mass of the grease composition. When the content of the thickener exceeds the upper limit value, the grease composition possibly fails to be sufficiently spread in the sliding portion, for example, the axle shaft rolling bearing to which the grease composition of the embodiment is applied. When the content of the thickener is less than the lower limit value, the grease composition of the embodiment is excessively softened to possibly leak from the sliding portion, for example, the axle shaft rolling bearing. Accordingly, when the thickener having the worked penetration within the above-described range is contained, the grease composition of the embodiment can exhibit a desired fluidity without leaking from the sliding portion, for example, the axle shaft rolling bearing, to which the composition is applied.

Note that the worked penetration of the grease composition can be measured based on, for example, JIS K2220 7.

<2. Method for Producing Lubricant>

Another aspect of the present invention relates to a method for producing the lubricant of one aspect of the present invention. The method of the aspect is not particularly limited, and various kinds of methods are applicable. For example, the method of the aspect includes a step of mixing the base oil with the additive comprising the carbon black (hereinafter also referred to as a "mixing step").

In the method of the aspect, when the grease composition of one embodiment of the present invention is produced, the mixing step is preferred to be performed by mixing the base oil with the additive comprising the carbon black and the thickener.

In the method of the aspect, the mixing step can be performed using kneading means usually used in the technical field, such as a roll mill, a Fryma mill, a Charlotte Colloid Mill®, or a homogenizer. In the mixing step, the order of mixing each kind of components is not specifically limited. For example, the additive comprising the carbon black and, in some cases, the thickener may be simultaneously added and mixed or may be separately (for example, continuously or at a predetermined interval) added and mixed in the base oil.

<3. Kit>

Another aspect of the present invention relates to a kit for improving the control stability of the automobile including the discharging member including the protrusion that performs the self-discharging by air-ionizing and the lubricant of one aspect of the present invention.

In the kit of the aspect, the above-exemplified discharging member relating to the lubricant of one aspect of the present invention is applicable as a discharging member. The above-described discharging member can usually be disposed in a vehicle body (for example, attached on a bumper, a wheelhouse, or an undercover) in an automobile or the like to which the kit of the aspect is applied. Applying the kit of the aspect to the automobile or the like enables to improve the control stability of the automobile or the like by removing the positive electric charge charged on the surfaces of the vehicle body and/or the tires via the discharging member in addition to the sliding portion, for example, the axle shaft rolling bearing of the automobile or the like.

<4. Method for Improving Control Stability of Automobile>

Another aspect of the present invention relates to a method for improving control stability of an automobile. The method of the aspect includes a step of applying the lubricant of one aspect of the present invention to the sliding portion of the automobile (hereinafter also referred to as a "lubricant application step"). The method of the aspect can further include a step of disposing the discharging member including the protrusion that performs the self-discharging by air-ionizing on the vehicle body of the automobile (hereinafter referred to as a "discharging member disposing step") in some cases.

In the method of the aspect, performing the lubricant application step enables to further improve the control stability of the automobile by removing the positive electric charge charged on the surfaces of the vehicle body and/or the tires via the sliding portions, for example, the axle shaft rolling bearings.

In the discharging member disposing step, the above-exemplified discharging member relating to the kit of one aspect of the present invention is applicable for the discharging member including the protrusion that performs the self-discharging by air-ionizing.

EXAMPLES

The following further specifically describes the present invention using Examples. However, the technical scope of the present invention is not limited to these Examples.

<I: Preparation of Lubricants>

Lubricants in forms of grease compositions of Example 1 and Comparative Example 1 were prepared by adding a thickener (an aromatic diurea compound, a reaction product of 4,4'-diphenylmethane diisocyanate and p-toluidine), a carbon black (primary particle size: 10 to 20 nm), polytetrafluoroethylene (PTFE, average particle size in particle size distribution: 5 μm), and other additives (an antioxidant, a rust inhibitor, and an antiwear agent) into a base oil (a paraffin mineral oil, kinematic viscosity: 75 mm$^2$/s (40° C.)), and kneading it with a triple roll mill. The structure of the aromatic diurea compound is illustrated below. The contents of the respective components in the lubricants of Example 1 and Comparative Example 1 are illustrated in Table 1. In the table, the contents of the respective components are indicated as mass % with respect to the total mass of the lubricant.

[Chem 2]

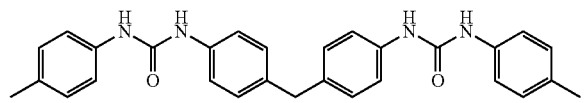

TABLE 1

|  |  | Example 1 | Comparative Example 1 |
|---|---|---|---|
| Base Oil |  | Balance | Balance |
| Thickener |  | 4 | 20 |
| Additive | Carbon Black | 5.0 | 0 |
|  | PTFE | 5.0 | 0 |
|  | Other | 1.8 | 1.8 |

<II: Performance Evaluation of Lubricants>

[Measurement Test of Worked Penetration]

Worked penetrations of the lubricants in forms of the grease compositions of Example 1 and Comparative Example 1 were measured based on JIS K2220 7. As a result, the worked penetrations of the lubricants of Example 1 and Comparative Example 1 were both 300.

[Measurement Test of Control Stability]

The lubricants in forms of the grease compositions of Example 1 and Comparative Example 1 were enclosed in axle shaft rolling bearings (hub units including a multiple-row angular contact ball bearing, made by JTEKT Corporation). Each of these axle shaft rolling bearings was assembled onto four wheels in front and rear, and right and left of a test vehicle. The specifications of the test vehicles are illustrated in Table 2.

TABLE 2

| Example/Comparative Example | Vehicle | Vehicle Model | L/O | Outline of Specifications | Hub Unit Bearing | Tires |
|---|---|---|---|---|---|---|
| Example 1 | RX450h | GYL25W-AWXGB(L) | '16/8 | 3.5L-HV Xe-4WD | Grease Composition of Example 1 | Standard Product |
| Comparative Example 1 |  |  |  |  | Grease Composition of Comparative Example 1 | 235/55/R20 |

The test vehicles of Example 1 and Comparative Example 1 were driven at a speed of 70 km/h. During driving, lane changes were repeated based on a steering method when the lane change illustrated in FIG. 1 was made. In the steering method illustrated in FIG. 1, the steering angle is changed from 0° to −30° to 0° in one second (this steering angle change is hereinafter also referred to as a "steering angle of 60°/second"). In the driving test, steering angles and vehicle yaw angle accelerations of the test vehicles of Example 1 and Comparative Example 1 were measured. The steering angle was measured by a steering angle sensor and a CAN data logger mounted on the vehicle. The vehicle yaw angle acceleration was measured by a gyro sensor (NAV440CA-200 made by CROSSBOW).

In order to quantitatively measure the control stability of the test vehicles, responsiveness of the test vehicles to the control of the test vehicles was evaluated. In this test, the controllability of the test vehicles was measured from the steering angles, and the responsiveness of behaviors of the test vehicles were measured from the vehicle yaw angle acceleration. Values of the vehicle yaw angle accelerations at the steering angle of 60°/second in the test vehicles of Example 1 and Comparative Example 1 are illustrated in FIG. 2.

Figure 2:
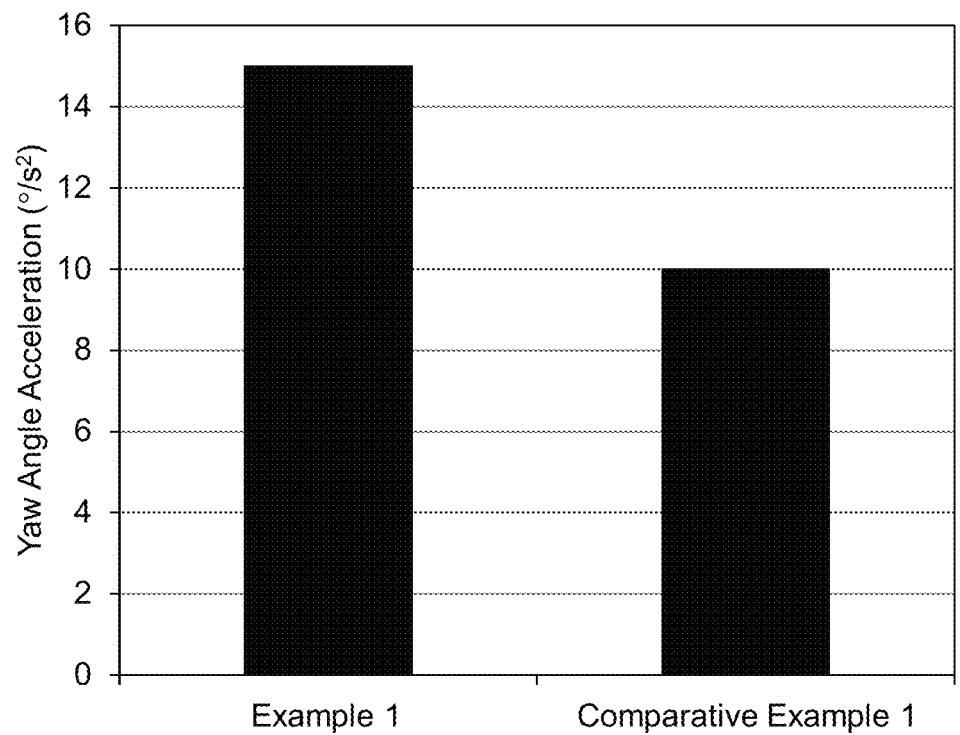
FIG. 2 is a graph that illustrates values of vehicle yaw angle acceleration at a steering angle of 60°/second in test vehicles in Example 1 and Comparative Example 1.

As illustrated in FIG. 2, the value of the vehicle yaw angle acceleration of the test vehicle of Example 1 was a significantly high value compared with the value of the test vehicle of Comparative Example 1. From this result, it has become evident that the use of the lubricant of Example 1 improved the responsiveness of the test vehicle to the steering of the test vehicle, and as a result, the control stability of the test vehicle was improved.

[Measurement Test of Charge Removal Effect of Vehicle Body]

A lubricant of Example 2 was prepared in the similar condition to that described above except for the changes in the lubricant of Example 1 of the content of the thickener to 3 mass %, the content of the carbon black to 5 mass %, the content of the PTFE to 10 mass %, the content of other additives to 1.8 mass %, and the content of the base oil to the balance. Using the lubricant of Example 2, a test vehicle was prepared in the similar condition to that described above.

Figure 3:
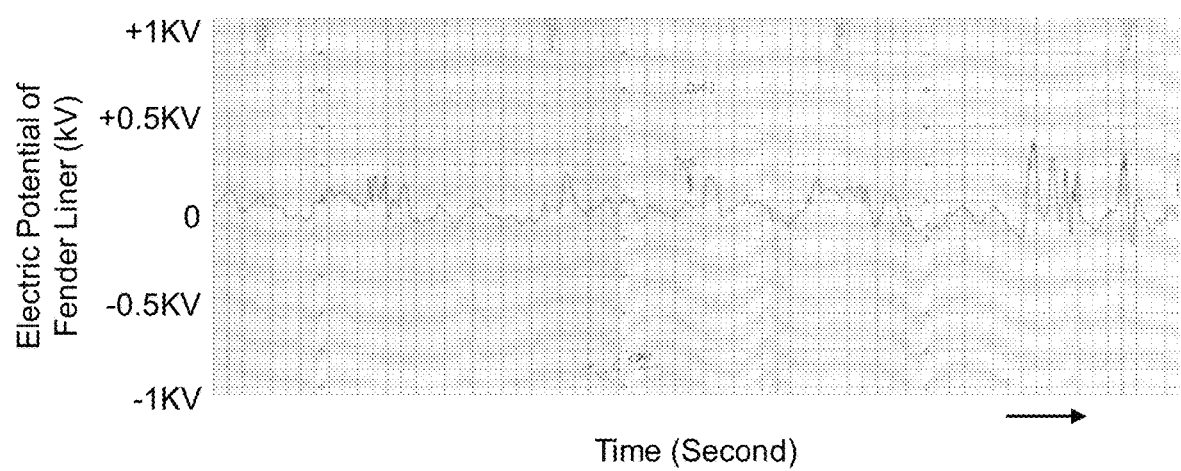
FIG. 3 is a graph that illustrates secular changes of electric potentials of fender liners during driving in test vehicles in Example 2 and Comparative Example 1.
Figure 3:
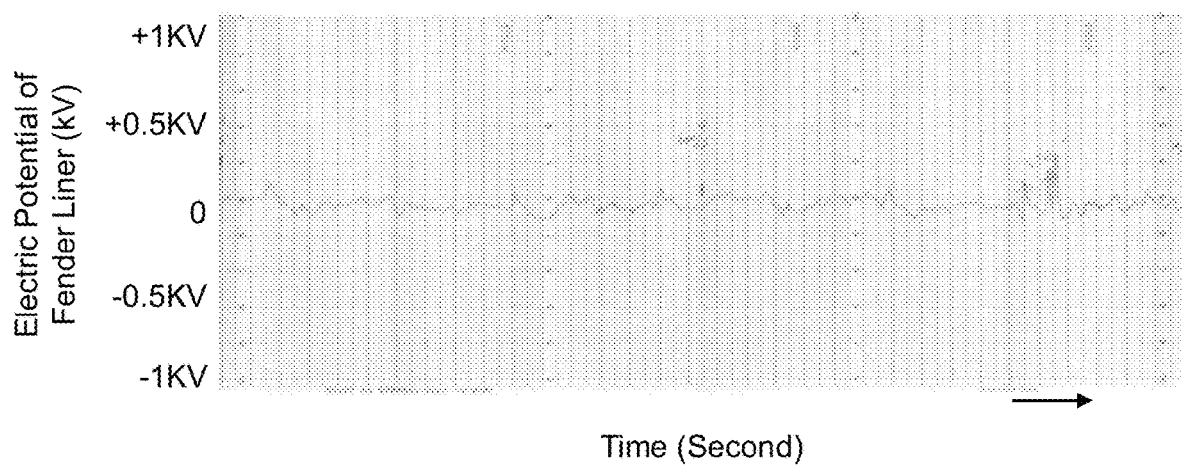

Test vehicles of Example 2 and Comparative Example 1 were driven at a speed of approximately 100 km/h from the start of driving. During driving, the contactless surface potential measuring device (with which surface potentials of positive electrode and negative electrode within a range of 0.1 to 5 kV are measurable) was used to measure electric potentials of a tire tread surface at the back of left rear wheel and electric potentials of a fender liner (a component opposed to the tire tread surface). Secular changes of the fender liner electric potentials are illustrated in FIG. 3. In the drawing, (a) indicates a measurement result of the test vehicle in Comparative Example 1 and (b) indicates a measurement result of the test vehicle in Example 2. In (a) and (b), the horizontal axes are elapsed times (second) and vertical axes are electric potentials (kV).

As illustrated in FIG. 3, in the case of the test vehicle in Comparative Example 1, the electric potential varied in a range of +0.34 to −0.24 kV. In contrast, in the case of the test vehicle in Example 2, the electric potential varied in a range of +0.09 to −0.12 kV. From the above-described results, it has become evident that the use of the lubricant of Example 2 removed the positive electric potential on the vehicle body and/or the charge on the tires and reduced the variation of charged electric potential on the vehicle body during driving the vehicle down to approximately ⅓.

All the publications, patents, and patent applications cited in the description are directly incorporated herein as references.

The invention claimed is:

1. A lubricant for improving control stability of an automobile, comprising:
   one or more base oils selected from the group consisting of a mineral oil, a hydrocarbon synthetic oil, a phenyl ether synthetic oil, an ester synthetic oil, a polyglycol synthetic oil, and a silicone oil; polytetrafluoroethylene having a particle size greater than 1 μm; a thickener being a diurea, and an additive containing a carbon black,
   wherein the lubricant is in a form of a grease composition.

2. A kit for improving control stability of an automobile, comprising:
   a discharging member including a protrusion that performs a self-discharging by air-ionizing; and
   the lubricant according to claim 1.

3. A method for improving control stability of an automobile, comprising
   a step of applying the lubricant according to claim 1 to a sliding portion of an automobile,
   wherein the improvement of control stability of the automobile is measured by a method comprising the measurement of steering angle or automobile yaw angle acceleration.

4. The method according to claim 3, further comprising
   a step of disposing a discharging member including a protrusion that performs a self-discharging by air-ionizing on a vehicle body of an automobile.

5. The method according to claim 3,
   wherein the sliding portion is an axle shaft rolling bearing.

6. The lubricant according to claim 1, wherein the base oil is a paraffin mineral oil.

7. The lubricant according to claim 1, wherein the base oil is a hydrocarbon synthetic oil containing a poly-α-olefin oil using 1-decene as a starting material and a co-oligomer oil of α-olefin and ethylene.

8. The lubricant according to claim 1, wherein the polytetrafluoroethylene has a particle size of greater than 1 μm and 15 μm or less.

9. The lubricant according to claim 1, wherein the polytetrafluoroethylene has a particle size of from 5 to 15 μm.

* * * * *